(12) United States Patent
Hardage et al.

(10) Patent No.: US 6,498,990 B2
(45) Date of Patent: Dec. 24, 2002

(54) SYSTEM AND METHOD FOR ORIENTING SEISMIC ENERGY SOURCES AND RECEIVERS TO YIELD DISCRIMINATED HORIZONTAL AND VERTICAL SHEAR WAVES

(75) Inventors: Bob A. Hardage, Austin, TX (US); James L. Simmons, Austin, TX (US); Allen L. Gilmer, Austin, TX (US)

(73) Assignee: Vecta Technology, Dallas, TX (US)

( * ) Notice: Subject to any disclaimer, the term of this patent is extended or adjusted under 35 U.S.C. 154(b) by 89 days.

(21) Appl. No.: 09/800,055

(22) Filed: Mar. 5, 2001

(65) Prior Publication Data

US 2002/0057628 A1 May 16, 2002

Related U.S. Application Data (63) Continuation-in-part of application No. 09/436,453, filed on Nov. 8, 1999.

(51) Int. Cl.[7] .................................................. G01V 1/28
(52) U.S. Cl. ........................ 702/14; 702/16; 367/56; 367/75
(58) Field of Search ............................ 702/14, 16, 17, 702/18; 367/75, 56

(56) References Cited

U.S. PATENT DOCUMENTS

| 4,803,666 | A | | 2/1989 | Alford |
|---|---|---|---|---|
| 4,817,061 | A | | 3/1989 | Alford et al. |
| 4,903,244 | A | | 2/1990 | Alford |
| 5,343,441 | A | | 8/1994 | Alford |
| 5,508,973 | A | * | 4/1996 | Mallick et al. ............... 702/18 |
| 5,610,875 | A | | 3/1997 | Gaiser |

OTHER PUBLICATIONS

Thesis by Bryan De Vault; Dec. 5, 2001; 110 pages.

* cited by examiner

*Primary Examiner*—Donald E. McElheny, Jr.
(74) *Attorney, Agent, or Firm*—Hitt Gaines & Boisbrun (57) ABSTRACT

A system for, and method of, orienting seismic energy sources and seismic energy receivers to yield discriminated horizontal and vertical shear modes. In one embodiment, the system includes: (1) an initial matrix representing wave energy produced by a selected seismic energy source and received by a selected seismic energy receiver, (2) a first transforming matrix that cooperates with the initial matrix to orient the selected seismic energy source with respect to the selected seismic energy receiver and (3) a second transforming matrix that cooperates with the initial matrix to orient the selected seismic energy receiver with respect to the selected seismic energy source, the initial matrix thereby transformed into a successive matrix containing the discriminated horizontal and vertical shear modes.

10 Claims, 10 Drawing Sheets

- PROCESSOR — 1005
- LONG TERM STORAGE — 1020
- STORAGE MEDIA DRIVE — 1030
- MEMORY — 1010
  - SOFTWARE — 1040

$$\begin{bmatrix} RR & RT \\ TR & TT \end{bmatrix} = \begin{bmatrix} \cos(\theta) & \sin(\theta) \\ \sin(\theta) & -\cos(\theta) \end{bmatrix} \begin{bmatrix} ii & ix \\ xi & xx \end{bmatrix} \begin{bmatrix} \cos(\theta) & \sin(\theta) \\ \sin(\theta) & -\cos(\theta) \end{bmatrix}$$

1140, 1120, 1110, 1130

SYSTEM AND METHOD FOR ORIENTING SEISMIC ENERGY SOURCES AND RECEIVERS TO YIELD DISCRIMINATED HORIZONTAL AND VERTICAL SHEAR WAVES

CROSS-REFERENCE TO RELATED APPLICATION

The present application is a continuation-in-part of U.S. patent application Ser. No. 09/436,453, filed on Nov. 8, 1999, entitled "Method of Seismic Exploration by Discriminating Horizontal and Vertical Shear Waves," commonly assigned with the present application and incorporated herein by reference.

TECHNICAL FIELD OF THE INVENTION

The present invention is directed, in general, to geophysical exploration and, more specifically, to a system and method for orienting seismic energy sources and receivers to yield discriminated horizontal and vertical shear waves.

BACKGROUND OF THE INVENTION

Currently, most geophysical techniques dealing with multi-dimensional seismic data do not discriminate or locate seismic energies of different orientations, such as the horizontal shear energy and the vertical shear energy portions of directed seismic energy. In a typical multi-dimensional seismic survey, a multi-mode seismic energy generator may be used to generate a preponderance of one orientation of seismic energy relative to a particular orientation, then a preponderance of energies orthogonal to the first, relative to the same orientation. However, the orientation of the received seismic energies changes at each receiver due to the fact that the orientation between the seismic energy source and each receiver in a multi-dimensional seismic array is different.

Differently oriented seismic energies travel differently through the subsurface strata based upon the characteristics of the subsurface strata. Thus, if a fault plane in the strata were in more of a vertical orientation relative to the plane defined by the seismic energy source-receiver line, the different seismic energies would have a different travel characteristic. The mapping of the subsurface features could be greatly enhanced through processing of these oriented seismic energies, especially in an orientation specific to the azimuths defined by each receiver with the seismic energy source. Additionally, important rock property information can be ascertained by comparing differences and similarities of the attributes of the oriented seismic energies.

However, the processing of such data is complicated, because the oriented energies are not easily discriminated into the differently oriented energies for each receiver-source azimuth. Also, the processing of these components is complicated since the orientation of the operational modes of the seismic energy source do not always correspond to the orientation of each and every receiver in the geophysical array. Many other problems and disadvantages of the prior art will be become apparent to one skilled in the art after comparing such prior art with the present invention as described herein.

SUMMARY OF THE INVENTION

To address the above-discussed deficiencies of the prior art, the present invention provides a system for, and method of, orienting seismic energy sources and seismic energy receivers to yield discriminated horizontal and vertical shear modes. In one embodiment, the system includes: (1) an initial matrix representing wave energy produced by a selected seismic energy source and received by a selected seismic energy receiver, (2) a first transforming matrix that cooperates with the initial matrix to orient the selected seismic energy source with respect to the selected seismic energy receiver and (3) a second transforming matrix that cooperates with the initial matrix to orient the selected seismic energy receiver with respect to the selected seismic energy source, the initial matrix thereby transformed into a successive matrix containing the discriminated horizontal and vertical shear modes.

In one embodiment of the present invention, the wave energy is expressed in the initial matrix as inline and crossline components. In a related embodiment of the present invention, the first and second transforming matrices are a function of locations of the seismic energy sources and seismic energy receivers. In another embodiment of the present invention, the wave energy is recorded. And in yet another embodiment of the present invention, a volumetric image of subsurface formations is determined as a function of the discriminated horizontal and vertical shear modes.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
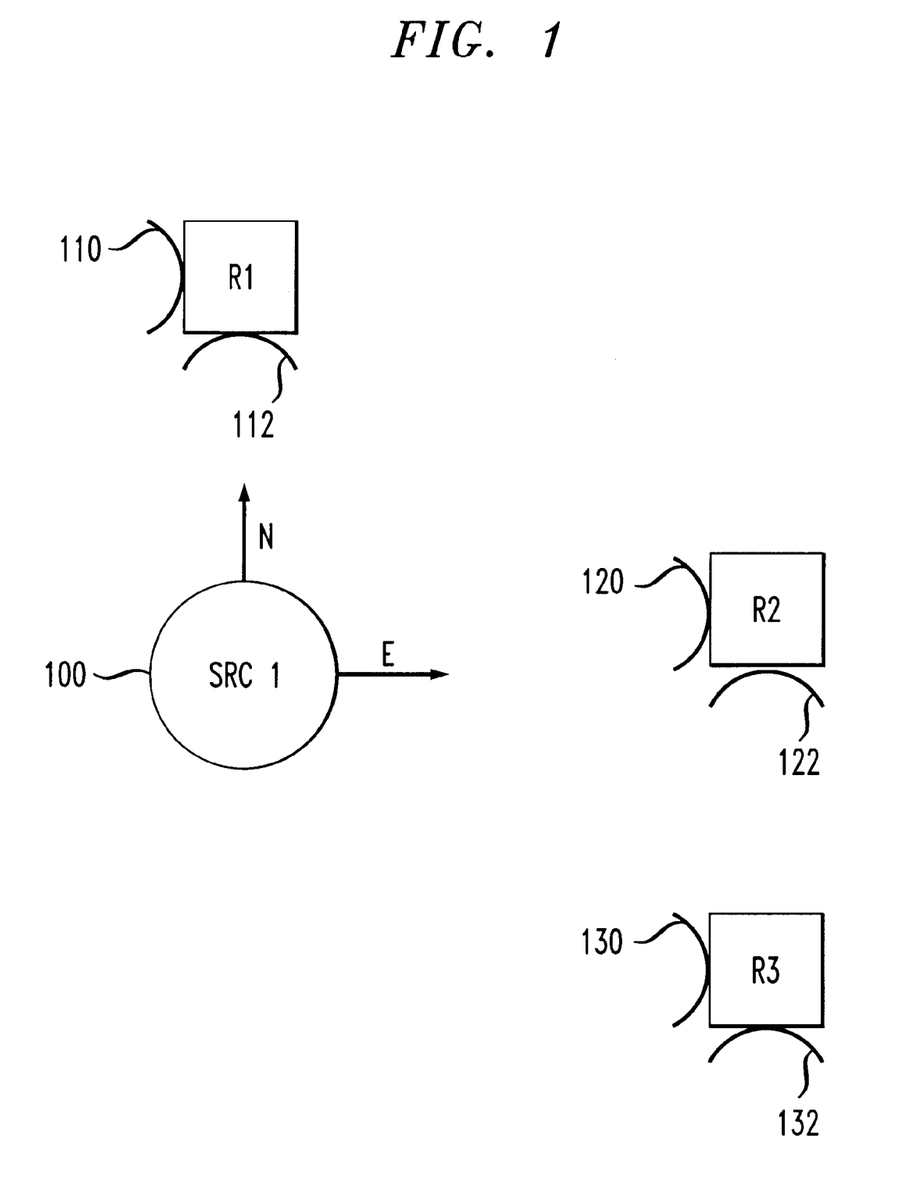
FIG. 1 is a schematic diagram of a typical volumetric seismic survey.

Referring initially to FIG. 1, illustrated is a schematic diagram of a typical volumetric seismic survey. A seismic energy source 100 is capable of producing differently oriented modes of seismic energies, as noted by the arrows "N" and "E" respectively. Thus, in one mode the seismic energy source 100 imparts seismic energy in a direction consistent with arrow N. In another mode, the seismic energy source 100 imparts seismic energy in a direction consistent with arrow E. In FIG. 1, the directions N and E are orthogonal, as is commonly practiced. However, the different directions of operation, or the modes of operation, need not be orthogonal.

The seismic energy imparted by the seismic energy source 100 into the subsurface formations of the earth contains seismic energy comprising energies of various orientations. Mainly these oriented seismic energies are known as vertical shear waves, horizontal shear waves, and compression waves.

Various seismic receivers R1, R2, and R3 are laid about the seismic energy source 100 in order to received and record the reflected seismic energies as propagated through the earth's surface from the seismic energy source 100. The receiver R1 contains a geophone 110 and a geophone 112. The geophones 110 and 112 are typically arranged in an orthogonal relationship to one another, however, they need not be. Thus, the geophones 110 and 112 are suited for obtaining information regarding the different orientations of the received reflected seismic energy. Correspondingly, a receiver R2 contains a geophone 120 and another geophone 122. The geophones 120 and 122 are also arranged such that they are suited for picking up differently oriented components of received seismic events, as originated by the seismic source 100, as transmitted through the earth's subsurface formation, and ultimately reflected by the earth's subsurface formations to the receiver R2.

The seismic energies produced by the seismic energy source 100 is reflected and received by the receivers R1, R2 and R3 through the various geophones contained within and disposed about them. As shown, a typical volumetric seismic survey contains numerous receivers arrayed about the seismic energy source.

Figure 2:
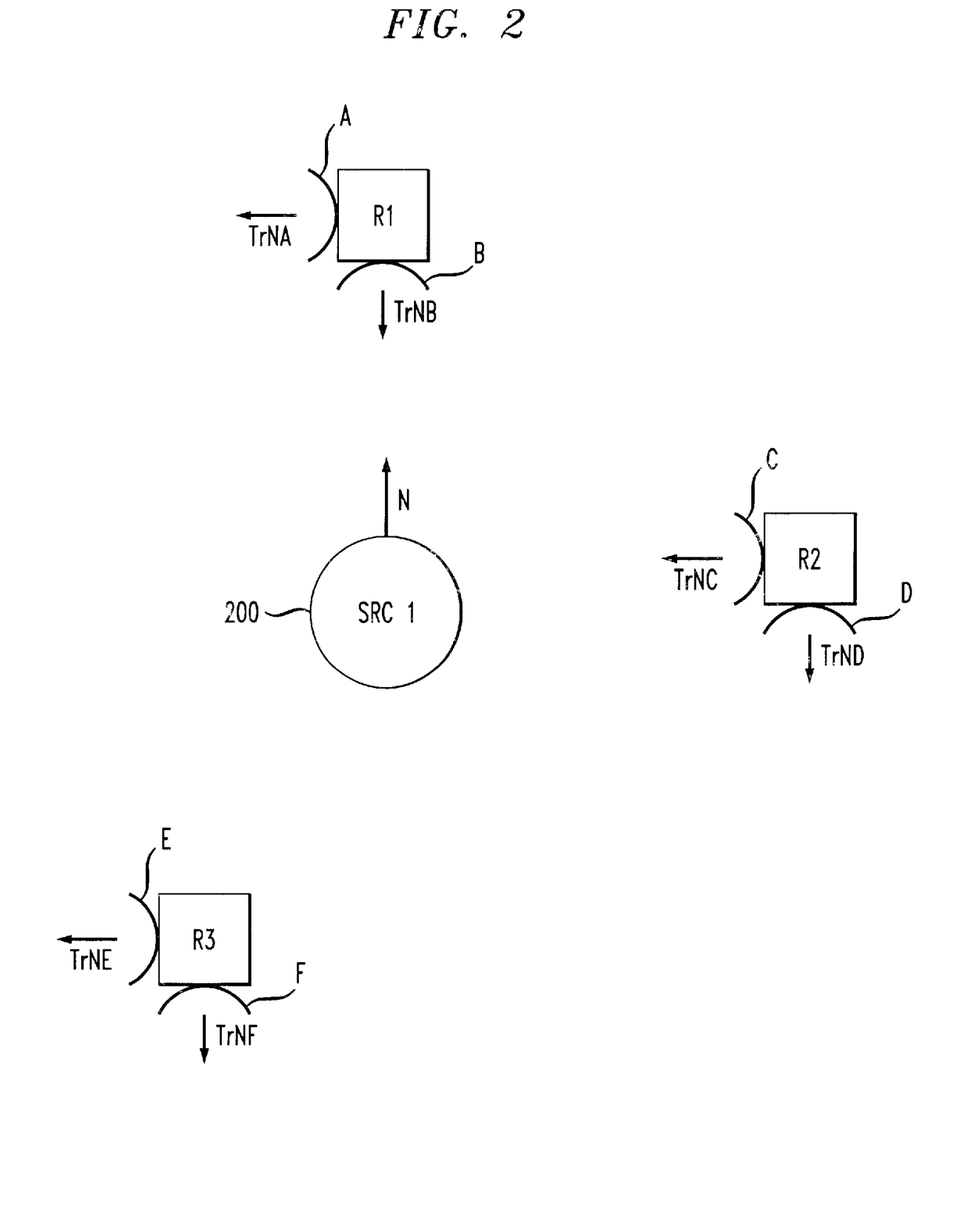
FIG. 2 is a diagram detailing the typical operation of a seismic energy source and several receivers during operation in a volumetric seismic survey.

FIG. 2 is a diagram detailing the typical operation of a seismic energy source and several receivers during operation in a volumetric seismic survey. First, a seismic energy source 200 is operated in a first mode, as indicated by the arrow N. This indicates that the seismic energy source 200 imparts seismic energy in a mode parallel and/or antiparallel to the direction indicated by the arrow N. This mode of operation of the seismic energy source 200 is one that produces a preponderance of energy corresponding to a vertical shear for a receiver R1, and corresponding to a horizontal shear for a receiver R2.

The seismic energy propagates through the earth's surface wherein it is reflected by subsurface formations, and proceeds back towards the surface. There, the receivers R1 and R2 detect the reflected seismic energy. The receivers detect the reflected energy and produce a signal corresponding to the detected reflected energy. This signal is recorded or stored, either by the receiver itself or the signal may be transmitted to a seismic recorder (not shown) for storage and later processing.

The receiver R1 is positioned to record these reflected seismic energies. The receiver R1 comprises a geophone A and a geophone B. The reflected seismic energies are captured by the geophones A and B and are subsequently recorded as traces in a data set.

The reflected seismic energy as initiated by the seismic energy source 200 in the N direction and detected by the geophone A is illustrated as TrNA. The reflected seismic energy as initiated by the seismic energy source 200 in the N direction and detected by the geophone B is illustrated as TrNB. These detected events are recorded as traces TrNA and TrNB.

Correspondingly, the receiver R2 is positioned to record these same reflected seismic energies. The receiver R2 comprises a geophone C and a geophone D. The reflected energy is captured by the geophones C and D and are subsequently recorded as traces in a data set. The traces detected and recorded by the geophone C is illustrated as TrNC, and the reflected energy as captured by the geophone D is indicated in the diagram as TrND. The subscripts TrNC and TrND refer to the corresponding traces of the geophones C and D when the seismic energy source 200 is operated in the mode as indicated by arrow N.

However, a receiver R3 is positioned in a non-parallel and non-perpendicular orientation to the azimuth defined between the seismic energy source 200 and the receiver R3 with respect to the modes of operation of the seismic energy source 200. The receiver R3 comprises a geophone E and a geophone F. The reflected seismic energy is detected by the geophones E and F. These detections are subsequently recorded as traces in a data set. The traces captured by the geophone E are illustrated as TrNE. Correspondingly, the reflected seismic energy as detected by the geophone F is indicated in the diagram as TrNF.

As indicated, the receiver R3 does not detect the reflected seismic energy in a manner that lends itself to discriminating between the orientations of energy in the modes of operation of the seismic source 200. The seismic energy source 200 does not operate in any mode that corresponds to a horizontal or vertical shear to the receiver R3. This is because the geophones E and F of the receiver R3 may or may not be aligned in parallel or in perpendicular orientations to the azimuth defined between the seismic energy source 200 and the receiver R3.

Figure 3:
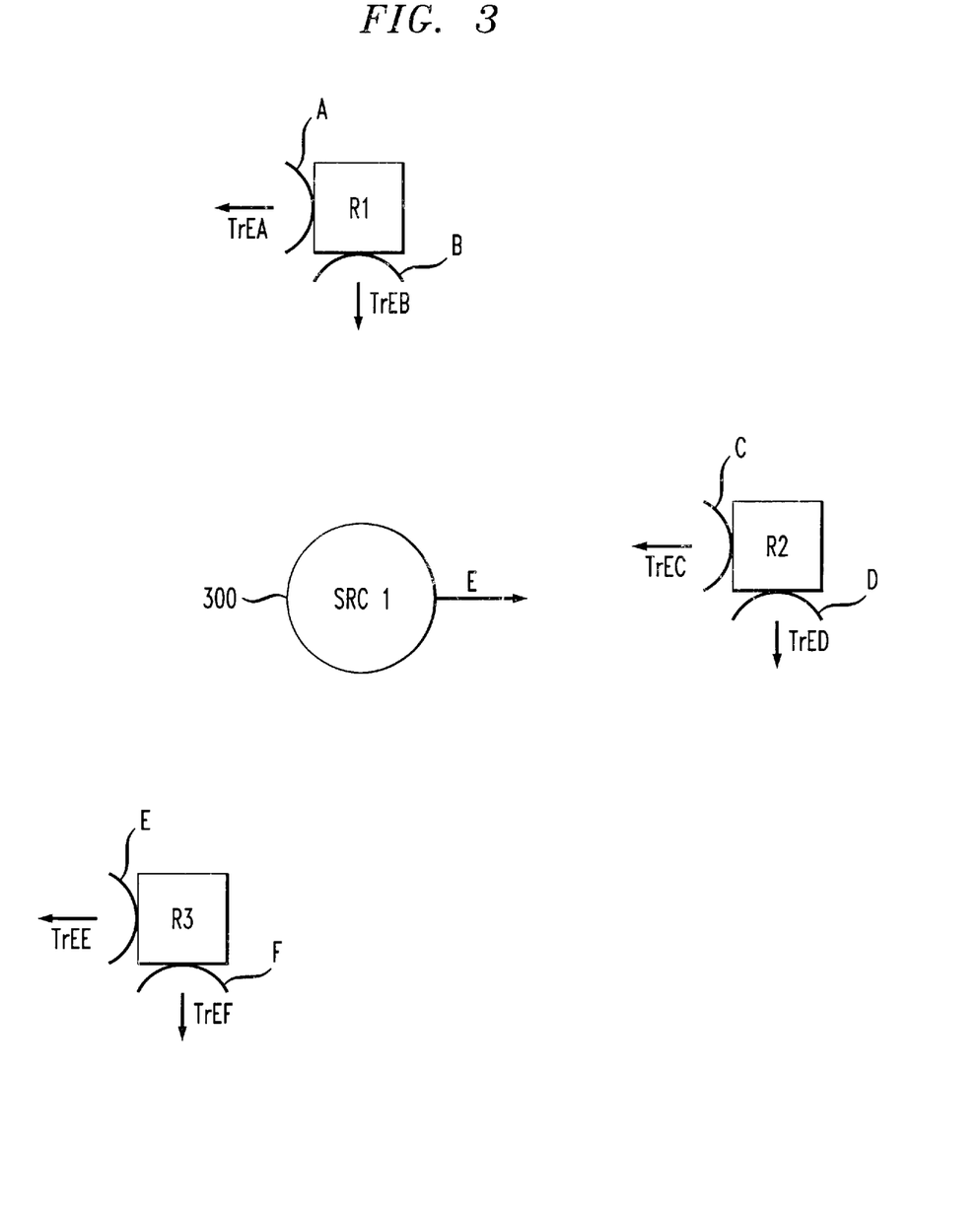
FIG. 3 is a diagram showing the operation of the seismic energy sources and receivers of FIG. 2 when the seismic energy source is operated in another directional mode of operation.

FIG. 3 is a diagram showing the operation of the seismic energy source and receivers of FIG. 2 when the seismic energy source is operated in another directional mode of operation. After the operation of the seismic energy source 200 in the first mode, as diagramed in FIG. 2, a seismic energy source 300 is operated in a second directional mode, as indicated by the arrow E. This indicates that the seismic energy source 300 imparts seismic energy in a mode parallel and/or antiparallel to the direction indicated by the arrow E. This mode of operation of the seismic energy source 300 is one that produces a preponderance of energy corresponding to a horizontal shear for a receiver R1 and corresponding to a vertical shear for a receiver R2.

The seismic energy again travels through the earth's surface where it is reflected by subsurface formations and proceeds back towards the surface. There, the receivers R1 and R2 detect the reflected energy. The receivers detect the reflected energy and record a signal corresponding to the capture of the reflected energy. This signal is stored either by the receiver itself, or may be transmitted to a seismic recorder for storage and later processing.

The reflected energy is detected by the receiver R1 by the geophones A and B and is subsequently recorded as traces in a data set. The energy detected by the geophone A is illustrated as TrEA, and the reflected energy as captured by the geophone B is indicated in the diagram as TrEB. The subscripts TrEA and TrEB also refer to the corresponding traces of the geophones A and B when the seismic energy source 300 is operated in the mode as indicated by arrow E. Correspondingly, the reflected energy is captured by the geophones C and D on the receiver R2 and is subsequently recorded as traces in a data set. The traces detected and recorded by the geophone C is illustrated as TrEC, and the reflected energy as detected and recorded by the geophone D is indicated in the diagram as TrED. The subscripts TrEC and TrED refer to the corresponding traces of the geophones C and D when the seismic energy source 300 is operated in the mode as indicated by arrow E.

However, a receiver R3 is positioned in a non-parallel and non-perpendicular orientation from the seismic energy source 300 with respect to the modes of operation seismic energy source 300. The receiver R3 comprises a geophone E and a geophone F. The reflected energies are captured by the geophones E and F and are subsequently recorded as traces in a data set. The traces detected and recorded by the geophone E are illustrated as TrEE. Correspondingly, the reflected energy as detected and recorded by the geophone F is indicated in the diagram as TrEF.

As indicated, the receiver R3 does not detect the reflected seismic energy in a manner that does lends itself to discriminating between the parallel and perpendicular components of the seismic energy source 300, relative to its orientation to the seismic energy source 300. The seismic energy source 300 does not operate in modes that correspond to these components, and the geophones E and F of the receiver R3 may or may not be aligned in parallel or in perpendicular orientations to the azimuth defined between the seismic energy source 300 and the receiver R3.

As indicated, the geophones contained on a receiver are typically oriented to capture orthogonally oriented seismic energy. However, the geophones may be aligned in any orientation with respect to one another. Further, the receiver may contain more than two geophones for greater discrimination of the oriented seismic energy.

Figure 4A:
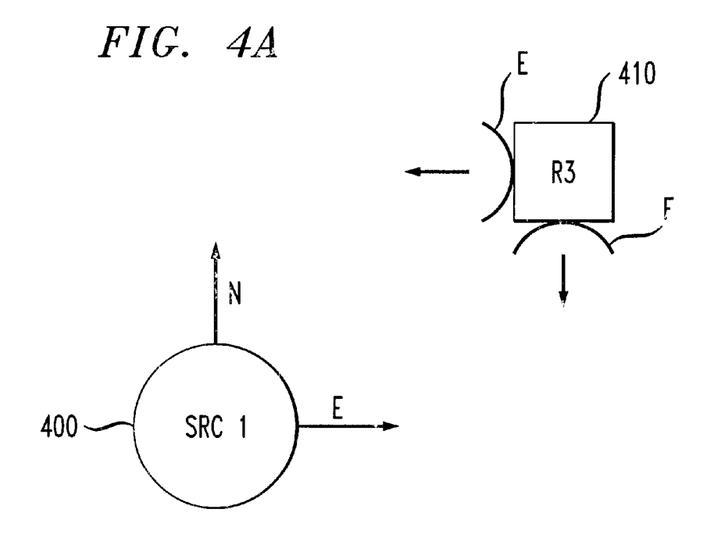
FIGS. 4A–B are diagrams of an embodiment of the invention of the seismic energy source and a receiver of FIGS. 2 and 3.
Figure 4B:
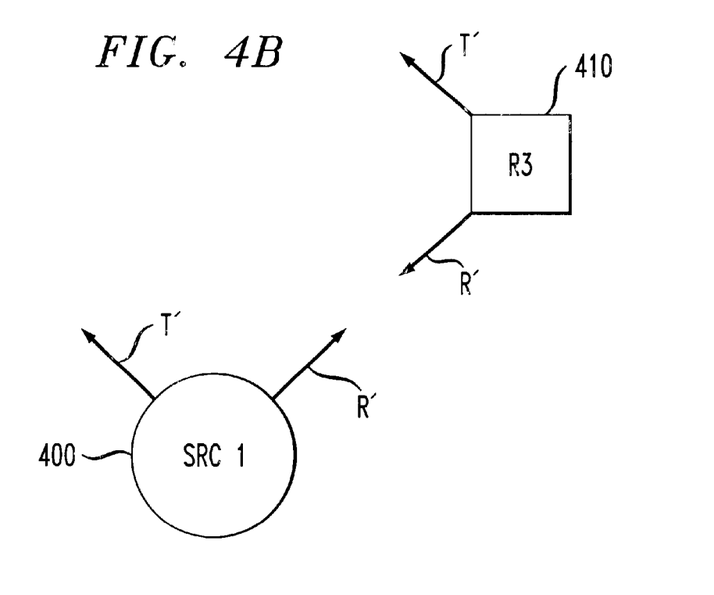

FIGS. 4A and 4B are diagrams demonstrating an embodiment of the invention wherein the receiver and seismic energy source operations are transformed into a coordinate system that easily discriminates between orthogonal components of energies. FIG. 4B shows the transformation of the operation of a seismic energy source 400, as described in FIGS. 2 and 3, into radial and tangential coordinates for processing, relative to the orientation between the seismic energy source 400 and any arbitrary receiver 410. The operation of the seismic energy source 400 in the first coordinate system, as shown and described in FIGS. 2 and 3, is transformed to a coordinate orientation where the modes of operation of the seismic energy source 400 are in radial and tangential form with respect to a receiver 410.

Thus, the transformed modes of operation for the seismic energy source 400 are denoted as T' and R'. This transformation is accomplished by rotating the receiver 410 and the seismic energy source 400 in an orientation that reflects the operation of these components in orthogonal relationship to one another. In this embodiment, the operations of the functional seismic components 400 and 410 are rotated relative to the angle between them. Thus, the operations of both components may be viewed in a radial and transverse orientation to one another.

The energy components N and E of FIG. 4A are transformed into the energy operational components T' and R' of FIG. 4B. Similarly, the traces received at the geophones E and F at the receiver 410 are transformed into the radial and tangential traces TrR and TrT, respectively. The transformation takes place for each receiver, and a transformation of the seismic events creating these traces also takes place for each receiver. These transformations allow the discrimination and/or isolation of radial and tangential orientations of energy produced by the seismic energy source 400 and the received and detected energies at each receiver.

Figure 5A:
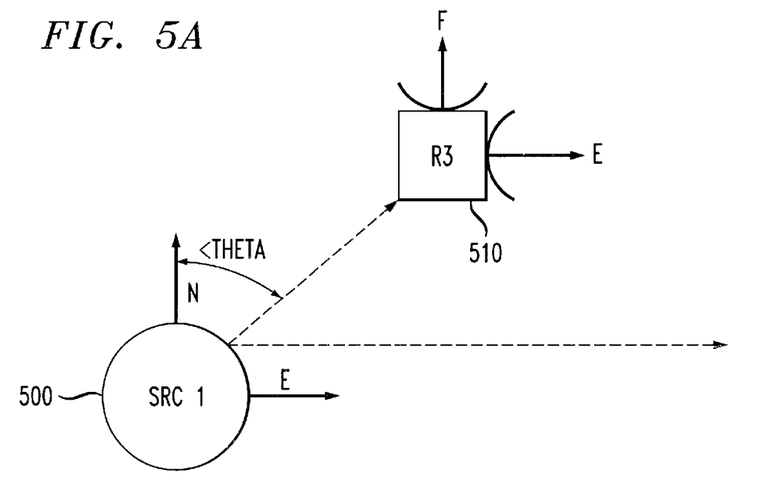
FIGS. 5A–C detail the transformation of the seismic energy source to the new coordinate system.
Figure 5B:
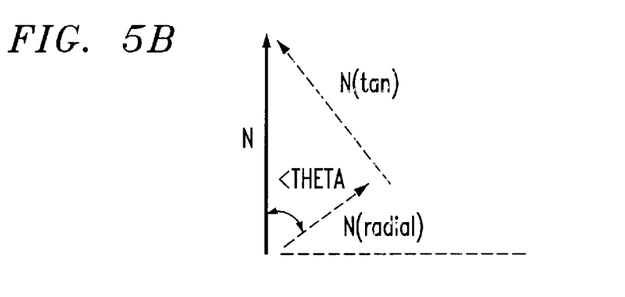
Figure 5C:
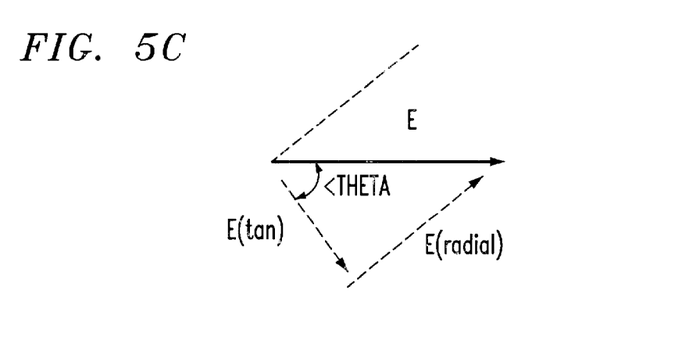

FIGS. 5A, 5B and 5C detail the transformation of FIG. 4 of the seismic energy source modes of operation to the new coordinate system. A seismic energy source 500 and a receiver 510 are located at an angle theta from one another. The arrows N and E denote the modes of operation of the seismic energy source 500. The new operational modes of the seismic energy source 500 are determined by accumulating the respective components of each operational mode. As shown in FIG. 5B, the N operational mode contains components of operation in radial N(radial) and tangential N(tangent) orientations of the direction between the seismic energy source 500 and the receiver 510. Similarly, in FIG. 5C the E operational mode contains components of operation in radial E(radial) and tangential E(tangent) orientations of the direction between the seismic energy source 500 and the receiver 510. These components are determined for each actual operational mode, and added together to produce a radial mode of operation and a tangential mode of operation relative to the receiver.

Geometrically, the radial component of the transformed operational mode may be determined by:

$$\text{Radial excitation} = N\cos(\theta) + E\sin(\theta),$$

where N and E represent the physical operational modes of the seismic energy source 500. Similarly, the tangential component of the transformed operational mode may be determined by:

$$\text{Tangential excitation} = N\sin(\theta) - E\cos(\theta),$$

where N and E again represent the physical operational modes of the seismic energy source 500.

Figure 6A:
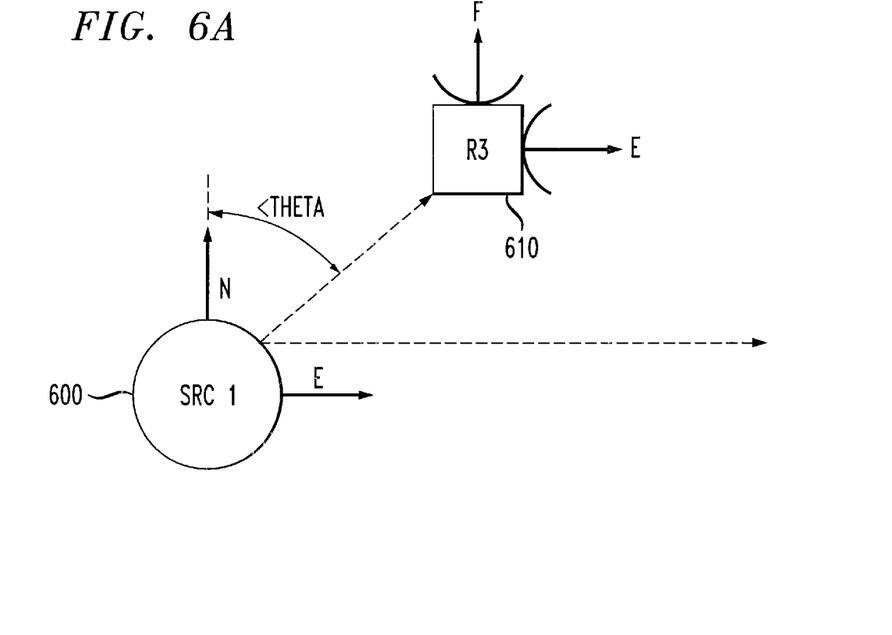
FIGS. 6A–C are diagrams detailing the determination of the transformed traces of the receiver of FIG. 4 into the new coordinate system.
Figure 6B:
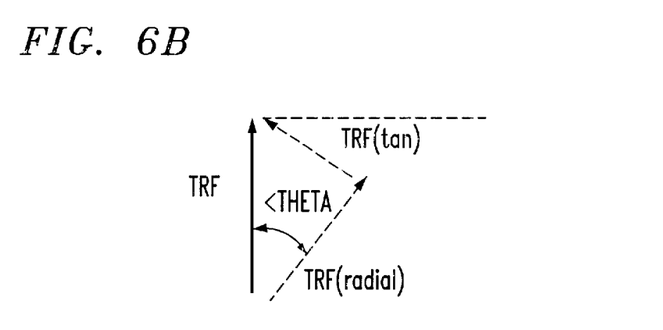
Figure 6C:
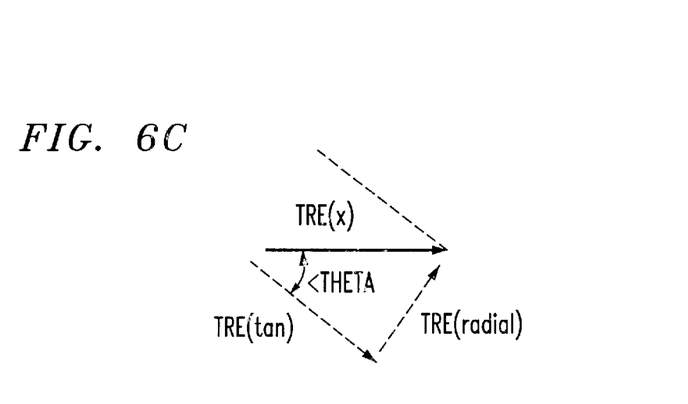

FIGS. 6A, 6B and 6C are diagrams detailing the determination of the received traces of the receiver 410 of FIG. 4 into the new transformed coordinate system. The arrows TrN and TrE denote the traces of a single activation of a seismic energy source 600. New traces are determined from the received traces, and the new traces correspond to the new operational modes of the seismic energy source 600, as detailed previously.

The received traces for a single excitation of the energy source 600 are then transformed into the same coordinate system. The traces as received by a receiver 610 are determined by accumulating the respective components of each trace in the new radial-tangential coordinate system. As shown in FIG. 6B, the received trace TrF contains components in the radial and tangential orientation, the orientation determined by the angle theta between the seismic energy source 600 and the receiver 610.

Similarly, in FIG. 6C the received TrE trace contains components in the radial and tangential determined by the angle theta between the seismic energy source 600 and the receiver 610. The corresponding components of the actual received traces in the radial and tangential orientations are summed to produce a trace in the corresponding radial or tangential orientation with respect to the seismic energy source 600.

Geometrically, the radial transformed trace may be determined by:

Radial trace=TrFcos(theta)+TrEsin(theta), where TrE and TrF represent the traces received at the geophones E and F, respectively, during an excitation of the seismic energy source 600. Similarly, a tangential trace may be determined by:

Tangential trace=TrFsin(theta)−TrEcos(theta), where TrE and TrF again represent the traces received at the geophones E and F, respectively, during an excitation of the seismic energy source 600.

This process is repeated for all the receivers, such as the receivers R1 through RN (where N=3 in FIG. 1, for example) for a survey. As such, the actual operational modes of the seismic energy source are resolved into components in the radial and transverse directions to the receiver, for each and every receiver. The traces received by a receiver are similarly transformed into a radial and tangential coordinate system defined by the inherent angle (the angle theta in FIG. 6A) between the particular receiver and the seismic energy source of interest. Thus, processing in a unique coordinate system for each receiver allows the discrimination of vertical shear energy and horizontal shear energy for each receiver in the survey. Processing may take place in this coordinate system throughout the entire seismic processing sequence.

Figure 7:
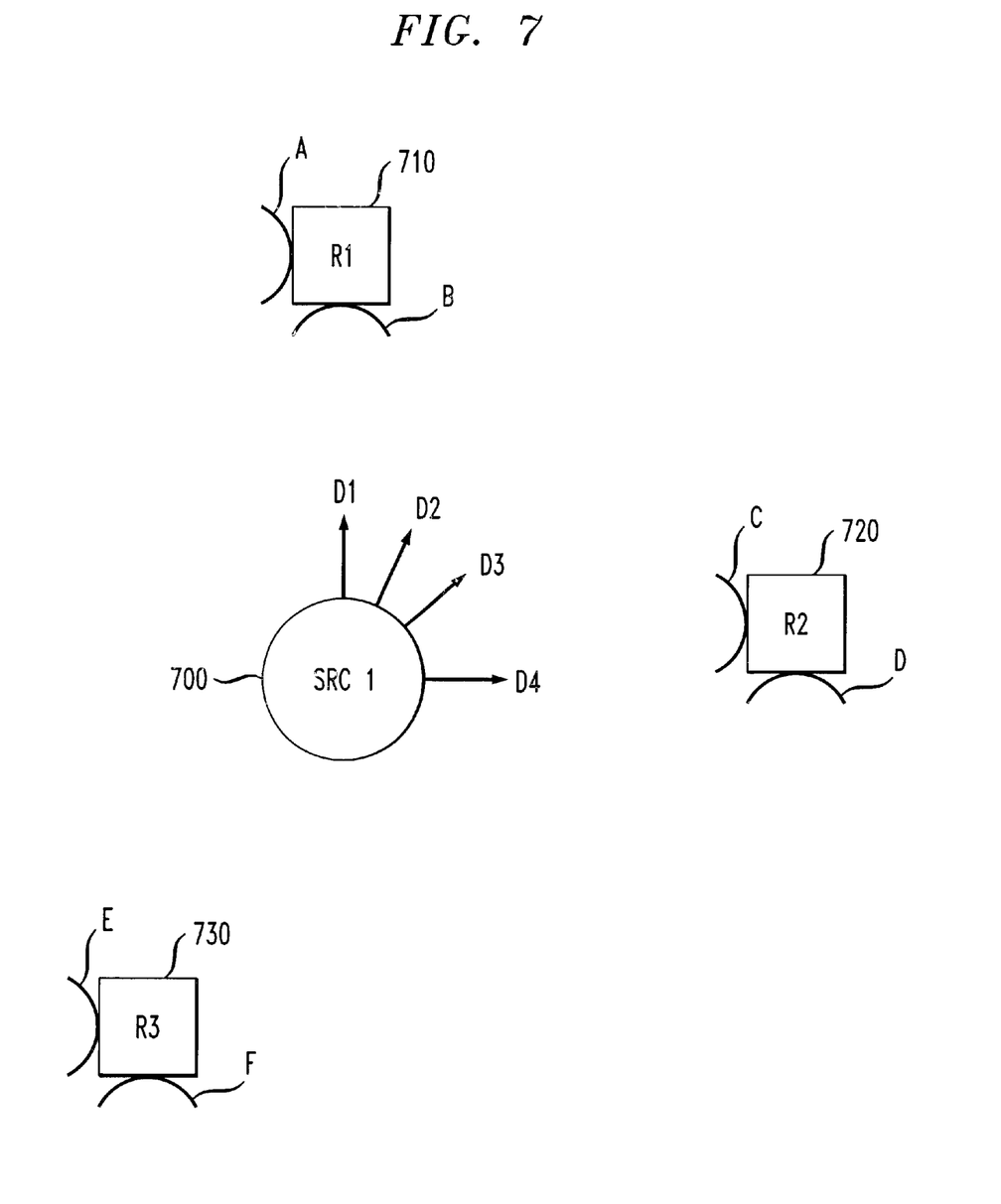
FIG. 7 is a block diagram of another embodiment of the invention of FIG. 4 wherein more than two modes of seismic energy source operation are envisioned.

FIG. 7 is a block diagram of an alternative embodiment of the invention of FIG. 4 wherein more than two modes of seismic energy source operation are envisioned. A seismic energy source 700 may be rotated to various orientations for the survey, as denoted by the arrows D1, D2, D3, and D4. Thus, the seismic energy source 700 may contain operational modes in a number of different orientations, as well as directions that are orthogonal to those orientations. Each operation of the seismic energy source 700 in a particular mode may be recorded by the receivers 710–730. The resulting seismic events created by the seismic energy source 700 may be broken down into radial-tangential coordinates for each receiver 710, 720, 730. The modes of incremental angles after rotating are simply resolved into the constituent component parts and reconstructed in the radial-tangential coordinate system. The seismic energy source 700 may sweep through a set angle in incremental steps, producing many responses in the receivers 710, 720, 730.

Additionally, using similar techniques as described above, each and every response at a receiver may be resolved into the components of the radial and tangential directions as defined by the angle inherent between each particular receiver and the seismic energy source 700 for each seismic event that the seismic energy source 700 produces. Additional techniques such as correlation and regression analysis may be used to further refine the distinctions between the horizontal and vertical shear components when the operational mode of the seismic energy source 700 is very close to being parallel or perpendicular to an individual receiver.

Figure 8:
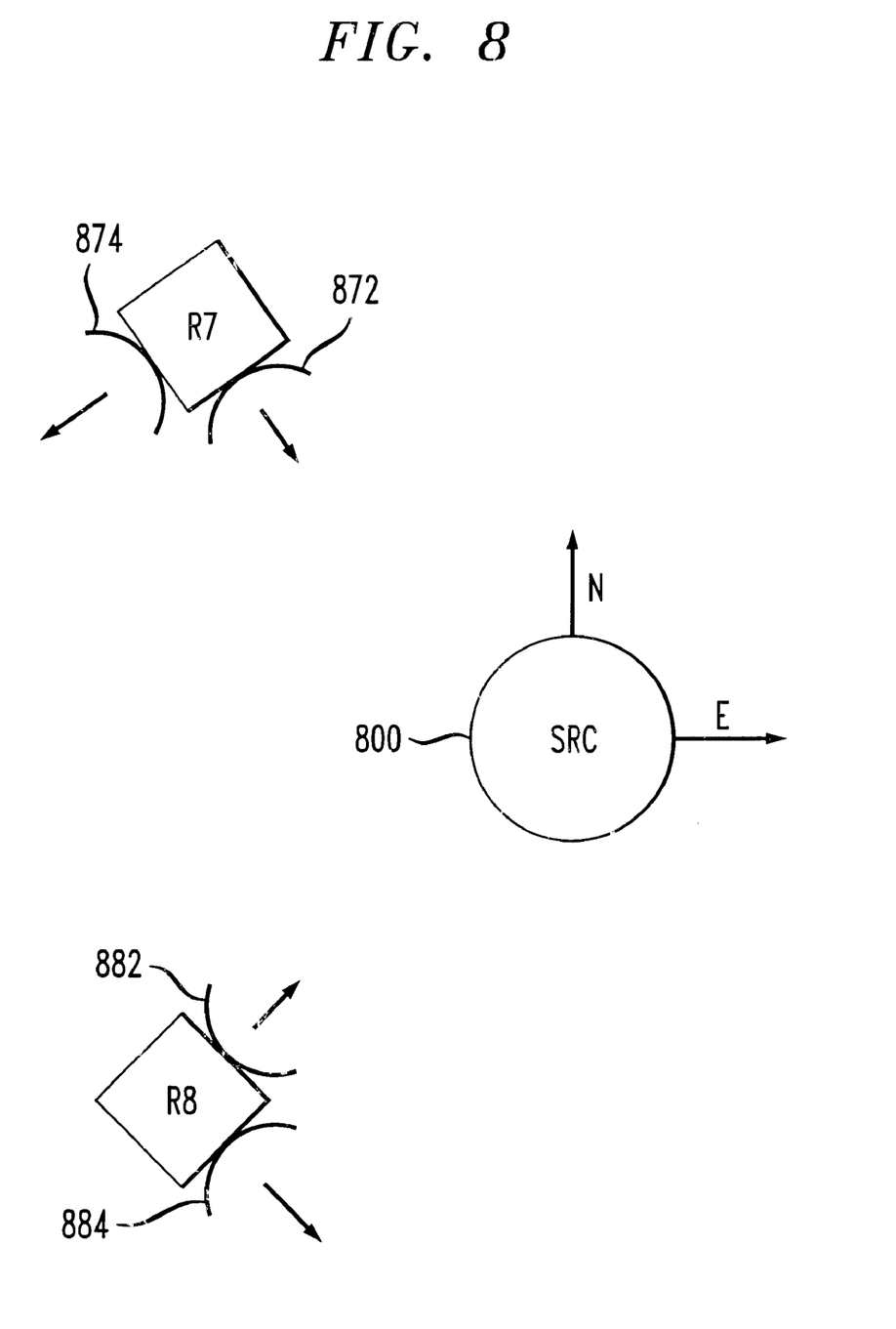
FIG. 8 is an alternative embodiment of the invention as described in FIG. 4, wherein the radial and tangential components of the traces are directly measured.

FIG. 8 is an alternative embodiment of the invention as described in FIG. 4, wherein the radial and tangential components of the traces are directly measured. A seismic energy source 800 is set in a seismic survey, and has more than one mode of operation. The transformed modes of operation of the seismic energy source 800 may be determined for each receiver as detailed before.

The receivers R7 and R8, which contain geophones 872 and 874, and 882 and 884, respectively, are physically oriented to be as parallel and perpendicular to the seismic energy source 800 as possible. Thus, minimal transformation is needed for resolving and transforming the traces in the processing and post processing phases of the geophysical survey.

Figure 9:
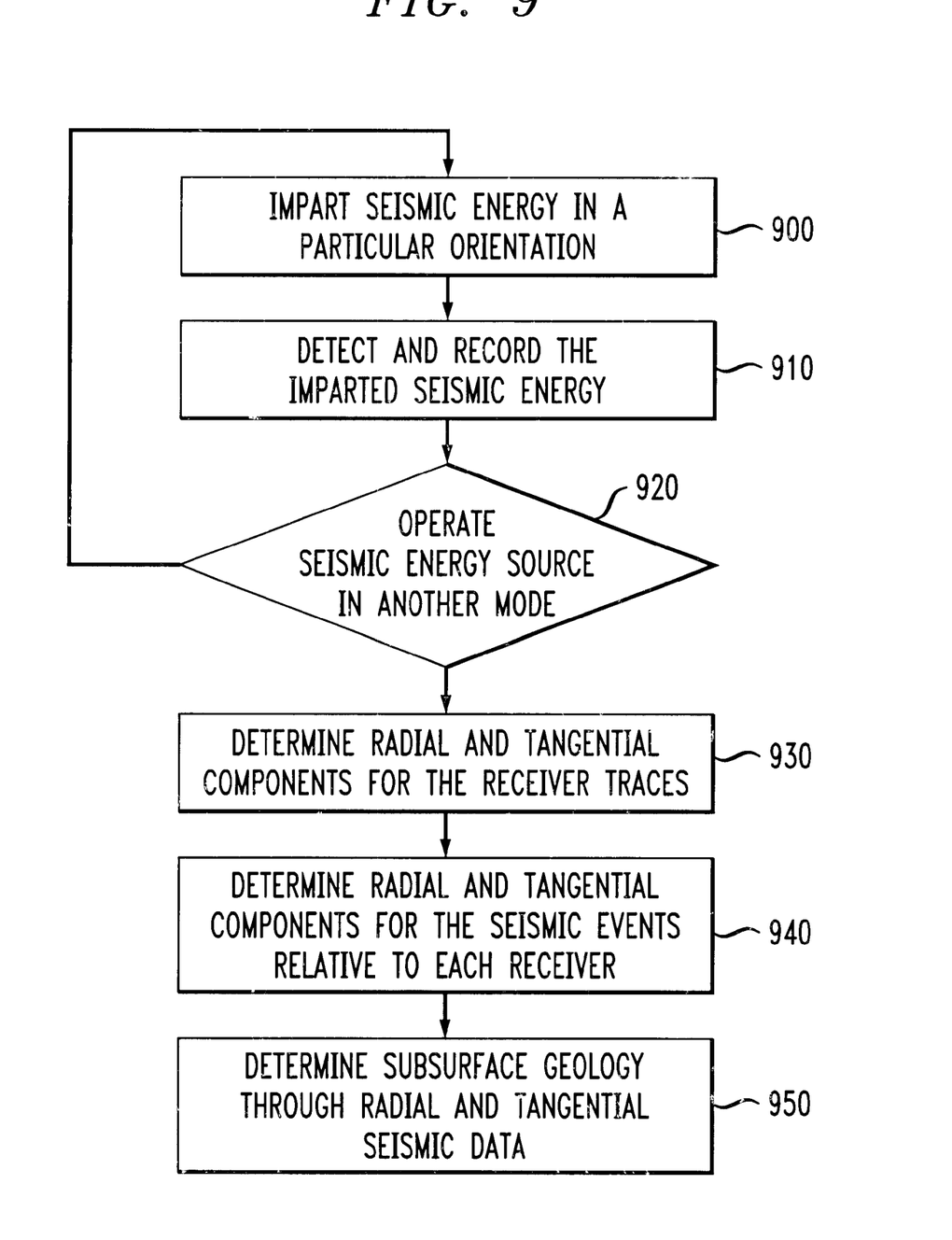
FIG. 9 is a flow diagram of practicing an embodiment of the invention of FIG. 4.

FIG. 9 is a flow diagram of practicing an embodiment of the invention of FIG. 4. In a block 900, a seismic energy source imparts seismic energy into the earth in one particular orientation. In a block 910, a plurality of geophones at a receiver detects the seismic energy originating with the seismic event initiated in block 900 and reflected from subsurface formations of the earth. This reflected energy is recorded by a seismic recording system on some media or in some electronic memory. At a block 920, a decision is made to operate the seismic energy source another time, in another oriented mode. If this is to be, control passes back to the block 900.

The radial and tangential portions for each receiver in the survey of the received seismic traces are isolated or discriminated in a block 930. This step may take place in processing, or may occur as described in FIG. 8.

The radial and tangential modes of operations of a seismic source are then determined in a block 940. The radial and tangential components for the seismic events are determined for each receiver, relative to the orientation of the particular receiver with respect to the seismic energy source, as in the embodiment detailed in FIG. 5.

In a block 950, the geological conditions of the subsurface are determined based on the transformed seismic events and the transformed traces received at the receivers.

Figure 10:
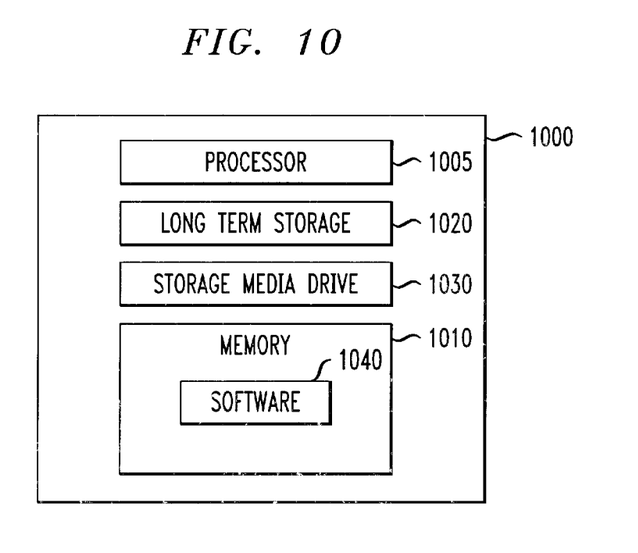
FIG. 10 is a block diagram of a computer system in which the invention of FIG. 4 may be practiced.

FIG. 10 is a block diagram of a computer system in which the invention of FIG. 4 may be practiced. A computer 1000 contains a processor 1005 and memory 1010. Additionally, the computer 1000 may also contain a long term storage device 1020 or a storage media drive 1030 from which a software program 1040 may be loaded into the memory 1010 for execution. The processor 1005 would then execute the steps of a method to isolate or discriminate radial and tangential portions of seismic events as produced by a seismic energy source and as received by one or more seismic receivers. The computer could then become an instrument capable of isolating or discriminating the radial and tangential seismic energy.

Figure 11:
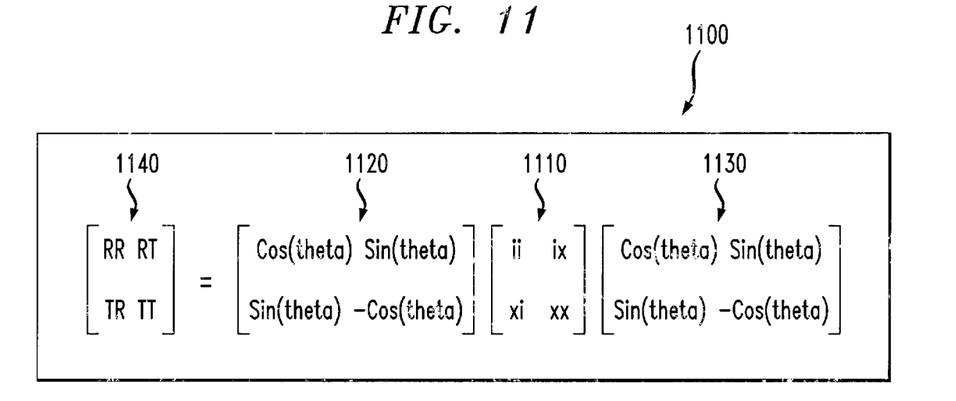
FIG. 11 is an embodiment of a matrix representation 1100 representing a system and method for orienting seismic energy sources and receivers to yield discriminated horizontal and vertical shear modes.

FIG. 11 is an embodiment of a matrix representation 1100 representing a system and method for orienting seismic energy sources and receivers to yield discriminated horizontal and vertical shear modes. The matrix representation 1100 includes an initial matrix 1110, a first transforming matrix 1120, a second transforming matrix 1130 and a successive matrix 1140.

The initial matrix 1110 represents wave energy produced by a selected seismic energy source and received by a selected seismic energy receiver. The first transforming matrix 1120 cooperates with the initial matrix 1110 to orient the selected seismic energy source with respect to the selected seismic energy receiver. The second transforming matrix 1130 cooperates with the initial matrix 1110 to orient the selected seismic energy receiver with respect to the selected seismic energy source. The initial matrix 1110 is thereby transformed into the successive matrix 1140 containing the discriminated horizontal and vertical shear modes. The wave energy is recorded in the computer system of FIG. 10 and is used to determine a volumetric image of subsurface formations as a function of these discriminated horizontal and vertical shear modes.

In the illustrated embodiment of FIG. 11, the elements of the initial matrix 1110 represent seismic traces resulting from pairing inline and crossline components associated with a seismic survey. The seismic survey employs an orthogonal grid wherein the term inline corresponds to parallel grid lines that extend in the direction of progression of a seismic survey. Accordingly, the term crossline corresponds to parallel grid lines that are perpendicular to the direction of progression of the seismic survey. Receivers may be positioned at intersecting points of the orthogonal grid, and a source may be positioned at a point within the orthogonal grid. The receivers themselves contain at least two orthogonal geophones that are positioned in the inline and crossline directions in the orthogonal seismic survey grid. Additionally, the seismic source imparts energy in the inline and crossline directions.

The elements of the initial matrix 1110, which represent vectors that are a function of time, may therefore be defined as follows:

ii=an inline—inline trace, employing an inline source and an inline receiver pair;

ix=an inline-crossline trace, employing an inline source and a crossline receiver pair;

xi=a crossline-inline trace, employing a crossline source and an inline receiver pair; and xx=a crossline—crossline trace, employing a crossline course and a crossline receiver pair.

As the seismic survey progresses, the seismic source may occupy several crossline locations before moving inline and repeating the pattern of crossline locations. At each seismic source location, an angle theta may be defined for each source-receiver pair involved in the seismic survey. The angle theta may be defined as the angle between a crossline vector emanating from the seismic source and a direct vector emanating from the seismic source to the receiver with which it is paired (as was illustrated in FIG. 6A above). Therefore, the angle theta may have any value from zero to 360° for various source-receiver pairs. Correspondingly, the elements of the first transforming matrix 1120 and the second transforming matrix 1130 are sine and cosine functions of the angle theta, as shown in FIG. 11. Therefore, the first and second transforming matrices 1120, 1130 are a function of locations of the seismic energy sources and seismic energy receivers.

The elements of the successive matrix 1140 represent seismic traces resulting from transforming inline and crossline source-receiver pairs associated with a seismic survey to produce radial and transverse responses. These radial and transverse responses represent the discriminated horizontal and vertical shear modes. The elements of the successive matrix 1140, which also represent vectors that are a function of time, may therefore be defined as follows:

RR=a radial trace, representing a radial source and a radial receiver pair;

RT=a radial-transverse crossterm trace, representing a radial source and a transverse receiver pair;

TR=a transverse-radial crossterm trace, representing a transverse source and a radial receiver pair; and TT=a transverse trace, representing a transverse source and a transverse receiver pair.

Although the present invention has been described in detail, those skilled in the art should understand that they can make various changes, substitutions and alterations herein without departing from the spirit and scope of the invention in its broadest form.

What is claimed is:

1. A system for orienting seismic energy sources and seismic energy receivers to yield discriminated horizontal and vertical shear modes, comprising:

an initial matrix representing wave energy produced by a selected seismic energy source and received by a selected seismic energy receiver;

a first transforming matrix that cooperates with said initial matrix to orient said selected seismic energy source with respect to said selected seismic energy receiver; and a second transforming matrix that cooperates with said initial matrix to orient said selected seismic energy receiver with respect to said selected seismic energy source, said initial matrix thereby transformed into a successive matrix containing said discriminated horizontal and vertical shear modes.

2. The system as recited in claim 1 wherein said wave energy is expressed in said initial matrix as inline and crossline components.

3. The system as recited in claim 1 wherein said first and second transforming matrices are a function of locations of said seismic energy sources and seismic energy receivers.

4. The system as recited in claim 1 wherein said wave energy is recorded.

5. The system as recited in claim 1 wherein a volumetric image of subsurface formations is determined as a function of said discriminated horizontal and vertical shear modes.

6. A method of orienting seismic energy sources and seismic energy receivers to yield discriminated horizontal and vertical shear modes, comprising:

expressing wave energy produced by a selected seismic energy source and received by a selected seismic energy receiver in an initial matrix;

applying a first transforming matrix to said initial matrix to orient said selected seismic energy source with respect to said selected seismic energy receiver; and applying a second transforming matrix to said initial matrix to orient said selected seismic energy receiver with respect to said selected seismic energy source, said initial matrix thereby transformed into a successive matrix containing said discriminated horizontal and vertical shear modes.

7. The method as recited in claim 6 wherein said wave energy is expressed in said initial matrix as inline and crossline components.

8. The method as recited in claim 6 wherein said expressing, said applying said first transforming matrix and said applying said second transforming matrix are repeated for others of said seismic energy sources and seismic energy receivers.

9. The method as recited in claim 6 further comprising recording said wave energy.

10. The method as recited in claim 6 further comprising determining a volumetric image of subsurface formations based on said discriminated horizontal and vertical shear modes.

* * * * *